Patented May 30, 1939

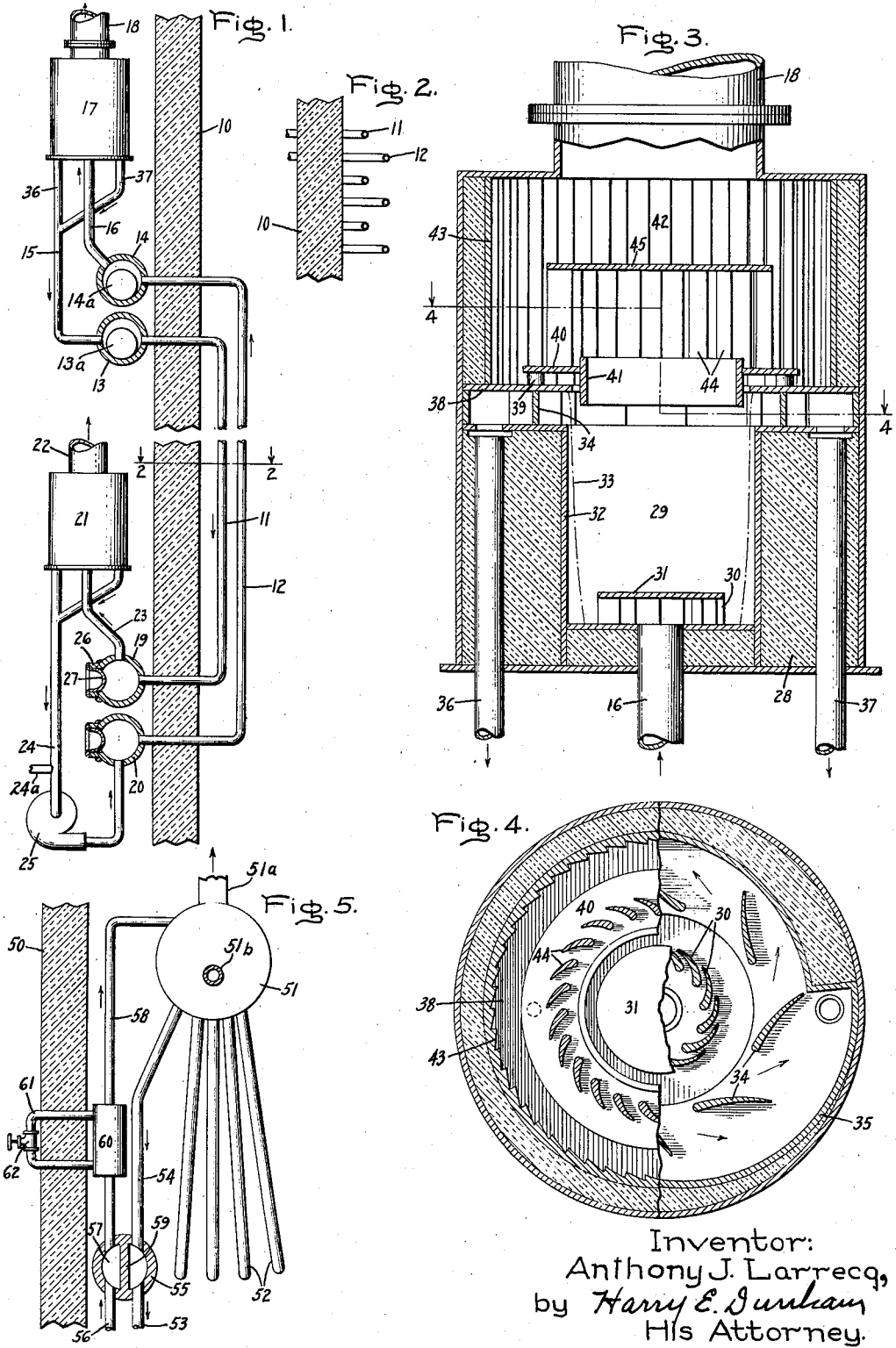

2,160,619

UNITED STATES PATENT OFFICE 2,160,619

MERCURY BOILER

Anthony J. Larrecq, Schenectady, N. Y., assignor to General Electric Company, a corporation of New York Application February 27, 1935, Serial No. 8,463
Renewed October 26, 1938

4 Claims. (Cl. 122—488)

The present invention relates to boilers, especially mercury boilers, using as operating medium mercury or a mixture of mercury and other substances, such as sodium, lithium or aluminum. More specifically, the invention relates to that element of boiler surface exposed to the radiant heat of the furnace, namely, the wall screen. These wall screens usually are in the form of a plurality of tubes lining the wall of a furnace or combustion chamber. In the type of boiler heretofore used, mercury liquid is conducted to the lower ends of the wall screen tubes by means of down-tubes disposed external the furnace, the term "down-tubes" being used to indicate the downward flow of fluid as compared with the wall screen tubes or up-tubes through which the mercury flows upwardly.

The object of my invention is to provide an improved construction and arrangement of mercury boilers having heating elements including down-tubes and up-tubes whereby the amount of mercury or operating medium necessary for operating a boiler is considerably reduced. This is accomplished in accordance with my invention by exposing both the up-tubes and the down-tubes to radiant heat and by the provision of liquid-vapor separating means connected to the ends of these tubes. With such an arrangement the down-tubes serve not only as a means for conducting liquid to the lower end of the up-tubes but also as a means for heating such liquid. Thus, in an arrangement according to my invention, both the down and the up-tubes constitute heat-absorbing surface.

For a consideration of what I believe to be novel and my invention, attention is directed to the following description and the claims appended thereto in combination with the accompanying drawing which forms a part of my specification.

In the drawing, Fig. 1 is a diagrammatic illustration of a mercury boiler embodying my invention; Fig. 2 is a sectional view along line 2—2 of Fig. 1; Fig. 3 is an enlarged detail view of a part of Fig. 1; Fig. 4 is a section along lines 4—4 of Fig. 3; and Fig. 5 is a modification according to my invention.

The arrangement shown in Figs. 1 to 4 comprises a furnace having a wall 10. The wall is lined by a plurality of down-tubes 11 and up-tubes 12. These tubes may be arranged in staggered relation. The upper ends of the tubes are connected to headers 13 and 14 including liquid-displacing elements 13a and 14a respectively. The headers 13 and 14 are connected by conduits 15 and 16 to a liquid-vapor separating device 17 having a vapor discharge conduit 18. The lower ends of the tubes 11 and 12 are connected to lower headers 19 and 20 respectively which in turn are connected to a liquid-vapor separator 21 having a discharge conduit 22. The connection between the header 19 and the separator 21 is effected by a conduit 23, the connection between the header 20 and the separator 21 being accomplished by a conduit 24 including a circulation pump 25. A conduit 24a is connected to the suction side of the pump 25 for conducting make-up mercury liquid to the system.

During operation, liquid mercury is conducted from the upper separator 17 through the discharge conduit 15 into the upper header 13, whence it flows through the down-tubes 11 into the lower header 19. The liquid is heated in the down-tubes 11 and is constrained to flow into the conduit 23 wherein its pressure is reduced below the vapor pressure corresponding to the temperature of the liquid, prior to introduction into the lower separator 21. The reduction of pressure causes a part of the liquid to evaporate, the vapor being discharged through the conduit 22 and the liquid being discharged through the conduit 24 and forced by the pump 25 in this conduit through the lower header 20 into the up-tubes 12. The liquid is heated in the up-tubes 12 and discharged into the upper header 14, whence it flows through the inlet conduit 16 into the separator 17. The pressure of the liquid discharged by the up-tubes is reduced below the vapor pressure corresponding to the temperature of the liquid in the conduit 16, thus causing partial vaporization of the liquid prior to its introduction into the conduit 18 and the separator 17. The vapor discharged through the liquid is returned to the down-tubes via header 13. With this arrangement a continuous circulation of fluid through the series-connected down-tubes and up-tubes takes place. The arrangement is preferably such that during normal operation the tubes are filled substantially entirely with liquid, the transformation into vapor mainly taking place externally of the furnace in the headers and the separators. With the tubes substantially filled with mercury liquid, a high rate of heat transfer is possible. This is a distinct advantage of the boiler, another advantage being, as stated before, that the liquid is heated in both down-tubes and up-tubes.

As to the design of the lower headers 19 and 20, it is to be noted that they are annular in shape and have lateral projections 26 welded to openings and closed by an inwardly projecting cup-shaped member 27. This facilitates cleaning of the lower headers in that it permits easy access to the interior of the lower headers, access being obtained by removal of the cup-shaped members 27.

Referring now more specifically to the particular design of the liquid-vapor separating devices 17 and 21, as shown in Figs. 3 and 4, these devices are alike in design. The device 17 includes a double-walled heat-insulated body 28 forming a lower chamber or space 29 having a bottom centrally connected to the inlet conduit 16. Secured to the bottom are a plurality of guide vanes 30 having a top plate 31. The guide vanes 30 and the top plate 31 deflect fluid discharged from the conduit 16 in tangential direction towards the cylindrical surface 32 of the chamber 29. The cross-sectional area between adjacent guide vanes 30 decreases in the direction of flow whereby fluid passes therethrough with increasing velocity. From another viewpoint, the pressure energy of the fluid discharged from conduit 16 is partly converted into velocity energy by the guide vanes 30 whereby the fluid is expelled at high velocity in tangential direction towards the wall surface 32. This causes rotation of the fluid and at the same time upward movement thereof. The inner surface of the body of fluid formed in the chamber 29 is indicated by a dash-dotted line 33. This fluid is primarily liquid because the centrifugal forces induced by the tangential motion of the fluid tend to separate the liquid and the vapor, the liquid being thrown outward by the action of the centrifugal force, and the vapor escaping to the central portion of the chamber 29. The body of liquid in the chamber 29 as it reaches the upper end thereof has considerable velocity. This velocity is partly converted into pressure by means of guide vanes 34 secured to the upper end of the chamber 29. The wall portion 35 surrounding the guide vanes 34 forms a scroll for receiving liquid discharged from the passages formed by said guide vanes 34. The guide vanes 34, as just pointed out, convert the velocity energy of the liquid into pressure energy and thereby increase the liquid pressure to force the liquid into the discharge conduit 15. The discharge conduit 15 has two branches 36 and 37 connected to diametrically opposite portions of the scroll. Thus, the liquid-vapor separator utilizes a part of the kinetic energy of the mixture discharged therein to recirculate the liquid and in this respect supports the action of the circulating pump 25. An annular plate 38 is secured to the upper ends of the guide vanes 34. This plate 38 forms a support for studs 39 which, together with an annular plate or ring 40, carry a cylindrical member 41. The latter forms a passage through which vapor is discharged into an upper or vapor space 42 of the separator. The vapor space 42 has a serrated wall 43. The fluid is discharged towards this wall by means of deflectors 44 concentrically disposed about the cylindrical member 41 and having lower ends secured to the ring 40 and upper ends secured to a disk 45. The provision of the serrated wall 43 and of the means for discharging the fluid towards this wall serves to remove or separate liquid particles contained in the vapor. The liquid particles flow downwardly along the serrated wall 43 through the annular space defined between the plate members 38 and 40 into the lower chamber 29 and the vapor is discharged through the conduit 18.

The modification shown in Fig. 5 comprises a furnace wall 50 and a porcupine type boiler having a drum 51 and porcupine tubes 52. The drum 51 is connected to a vapor discharge conduit 51ᵃ and a liquid supply conduit 51ᵇ. In addition, this boiler includes in accordance with my invention a wall screen heating element comprising a down-tube 53 receiving liquid from the drum 51 through a conduit 54 and a header 55. The lower end of the down-tube 53 is connected through a separator and a pump (not shown) similar to the arrangement of Fig. 1 to an up-tube 56 which discharges through a header 57 and a conduit 58 into the drum 51. The headers 55 and 57 in this arrangement correspond to the headers 13 and 14 of Fig. 1. In the present instance they are formed by a single tubular member having a separating wall 59. The conduit 58 for discharging fluid from the header 57 to the drum 51 also includes a strainer 60 having a bypass 61 with a valve 62. The arrangement of Fig. 5 is an application of my invention shown in Fig. 1 to a porcupine type boiler whereby the boiler drum 51 acts as a liquid vapor separator.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a boiler, an up-tube exposed to heat, means including a pump connected to the lower end of the up-tube for forcing liquid to be heated therethrough, a first liquid-vapor separating device connected to the upper end of the up-tube for separating the mixture of liquid and vapor discharged from the up-tube, a down-tube exposed to heat having an upper end connected to the liquid-vapor separating device for receiving liquid therefrom, means including a second liquid-vapor separating device connected to the lower end of the down-tube for separating the mixture of liquid and vapor discharged therefrom, said pump having an inlet conduit connected to the second liquid-vapor separating device, and means for discharging vapor from both devices, the first liquid-vapor separating device being located at a level above that of the tubes.

2. In a boiler, the combination of up-tubes and down-tubes located adjacent each other and uniformly exposed to heat, means for forcing liquid through the up-tubes, a vapor-separating device connected to the upper ends of all of the tubes, a second vapor-separating device connected to the lower ends of the down-tubes, and means for discharging vapor from both devices.

3. In a boiler, the combination of a plurality of up-tubes and down-tubes having upper ends and lower ends located substantially at the same levels, means for transmitting heat energy to both up-tubes and down-tubes, and separate liquid-vapor separating means connected to the upper and lower ends respectively of the tubes.

4. In a boiler, the combination of up-tubes and down-tubes having upper and lower ends located at substantially the same levels respectively, means for circulating operating fluid through the tubes, said means including a liquid-vapor separating device connected to the upper ends of the tubes and located above said upper ends, and another liquid vapor-separating device connected to and located near the lower ends of the tubes, separate vapor discharge conduits connected to both liquid vapor-separating devices and means for heating both tubes.

ANTHONY J. LARRECQ.